US007764224B1

(12) United States Patent
Anderson

(10) Patent No.: US 7,764,224 B1
(45) Date of Patent: Jul. 27, 2010

(54) ADVANCED SPOOFER MITIGATION AND GEOLOCATION THROUGH SPOOFER TRACKING

(75) Inventor: David A. Anderson, Hiawatha, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1097 days.

(21) Appl. No.: 11/441,799

(22) Filed: May 26, 2006

(51) Int. Cl.
G01S 1/00 (2006.01)
(52) U.S. Cl. .............................. 342/357.02; 342/357.15
(58) Field of Classification Search ............ 342/357.02, 342/357.06, 357.15, 357.17; 701/207, 213, 701/215
See application file for complete search history.

(56) References Cited

U.S. PATENT DOCUMENTS 7,283,090 B2 * 10/2007 Dentinger et al. ...... 342/357.02

OTHER PUBLICATIONS

Channel estimation modeling; Markku Pukkila, Nokia Research Center; S-72.333 Postgraduate Course in Radiocommunications, Fall 2000.

* cited by examiner

Primary Examiner—Dao L Phan
(74) Attorney, Agent, or Firm—Matthew J. Evans; Daniel M. Barbieri

(57) ABSTRACT

A GPS receiver employing advanced spoofer mitigation, geolocation and tracking capabilities through the use of a utility channel coupled in parallel to a tracking channel. The tracking channel tracks the direct signal while the utility channel tracks one or more spoofer signals. A signal from the primary channel is used by the utility channel to locate spoofer signals, with the primary channel operating independently of the utility channel. Three complementary spoofer mitigation methods are disclosed for identifying advanced repeaters and security-compromised spoofers, which may also be used for geolocation of such spoofers: (1) the consistency routine; (2) the nuller routine; and (3) the multiple antennas routine. An improved architecture is disclosed to allow easy upgrading and retrofitting of an existing GPS receiver.

17 Claims, 4 Drawing Sheets

ADVANCED SPOOFER MITIGATION AND GEOLOCATION THROUGH SPOOFER TRACKING

CROSS-REFERENCE TO RELATED APPLICATIONS

None

BACKGROUND OF THE INVENTION

1. Field of Invention

The present invention relates generally to the field of command, control, communications, computer, intelligence surveillance, and reconnaissance (C4ISR), navigation and timekeeping hardware and software systems and components, and in particular using Global Positioning System (GPS) spread-spectrum communications.

2. Description of Related Art

TTNT (Tactical Targeting Networking Technology) is an advanced tactical data link currently under development by the assignee of the present invention, Rockwell Collins Government Systems and the Advanced Technology Center. Modes supporting Low Probability of Detection (LPD) are a highly desirable addition to existing TTNT functionality. The primary challenge for an LPD receiver is to operate at extremely low signal-to-noise ratio (SNR), often well below negative 20 dB. Because an LPD system must operate at extremely low SNR, the known sequence of chips used for signal acquisition must be very long (on the order of 1 million chips) in order to produce reasonable probabilities of detection and false alarm. While GPS spoofer threats as defined herein are typically irrelevant to TTNT performance, extra copies of TTNT signals would affect TTNT, and, in addition, signal acquisition and signal tracking is affected by GPS spoofer threats. In addition, LPD performance is affected by jamming techniques from GPS threats. Rockwell Collins has successfully demonstrated beam-forming antennas and adaptive digital signal processing techniques to mitigate the impact of traditional jammer threats. Emerging GPS threats, such as repeaters and spoofers, attempt to deceive the user with false signals comprising copies of the original true signal, rather than denying the user access to the GPS signals, a threat that is termed "spoofing". The same effect can occur naturally from ghost signals from multipath echoes of the original (real) signal.

The Global Positioning System (GPS) is a US Department of Defense satellite based navigation system presently made of 24 satellites in orbit; the first satellite was launched in 1978. Each satellite lasts approximately 10 years, weighs about 2000 pounds, and transmits 50 W low power signals, comprising radio signals L1, L2, that are used for navigation.

Rockwell Collins is developing advanced acquisition techniques that use signal time and frequency consistency to allow the receiver to reject inconsistent copies of the original GPS signal during the acquisition process.

In the present invention, certain terms are used as appreciated by a skilled artisan. Thus "chip" is often defined as "channel bit". A spread spectrum system, such as used by the present invention, achieves its spectral spreading using one or more techniques such as direct sequence, forward error correction, and orthogonal channel coding. Regardless of the technique used, the bits produced by the spreading are often referred to as "chips". These chips are modulated and sent over the channel. This distinguishes the bits created by the spreading technique ("chips") from the information bits going into the spreading technique ("bits"). Note that spread spectrum chips are not required to be binary. "Chip rate" is the rate or frequency at which the chips are transmitted. In a spread spectrum system, the chip rate is much faster than the information bit rate, thus the spectral spreading. "Chip time" is the reciprocal of the chip rate, or the duration in time of a single chip. "Multiple chip times" refers to a period of time that is equal to more than one chip time. A "known sequence" is a sequence of chips (or bits, or symbols) of which an authorized receiver has prior knowledge. The known sequence is typically sent at the beginning of a transmission. The receiver performs a search for the known sequence in order to detect the presence of a desired signal and synchronize its signal processing to it. The process of detecting the presence of a desired signal is often referred to as the signal "acquisition". Signal acquisition precedes signal demodulation. After signal acquisition comes signal tracking, which can be defined for GPS tracking as the process of continuously estimating the phase of the GPS signal.

SUMMARY OF THE INVENTION

Accordingly, an aspect of the present invention is concerned with mitigating spoofing. The technology of the present invention forms an effective first line of defense against spoofers during the acquisition process, when the receiver is most vulnerable to deceptive signals. By design, the anti-spoof signal acquisition and signal tracking method and apparatus of the present invention detects and isolates false copies of the GPS signal, allowing the receiver to track only the real signals.

The present invention tracks false signals as well as real signals, an improvement over prior techniques. For basic navigation, tracking only the real signals is the ultimate goal of anti-spoofing; however, valuable defensive information is ignored by not tracking the false signals.

The present invention discloses an apparatus and method comprising hardware and software that is compatible with existing systems to track spoofer signals by providing a utility channel to track spoofer signals, coupled to a primary channel which tracks the true signal. The utility channel is capable of simultaneously tracking multiple copies of the signal in parallel with the primary channel; by contrast, standard tracking channels can only track a single signal. This allows the receiver to track all "extra" copies of the signals (e.g. the spoofer signals) without running out of channels.

The present invention further discloses how a receiver may geolocate a simple or advanced spoofer. Thus the present invention discloses three methods for identifying and geolocating advanced spoofing repeaters and security-compromised spoofers: a consistency method, a nuller/beamformer method and a multiple antennas method. Though these three methods per se have been used in the past, the combination of the primary/utility channel architecture of the present invention with any these three methods is novel.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

Figure 1:
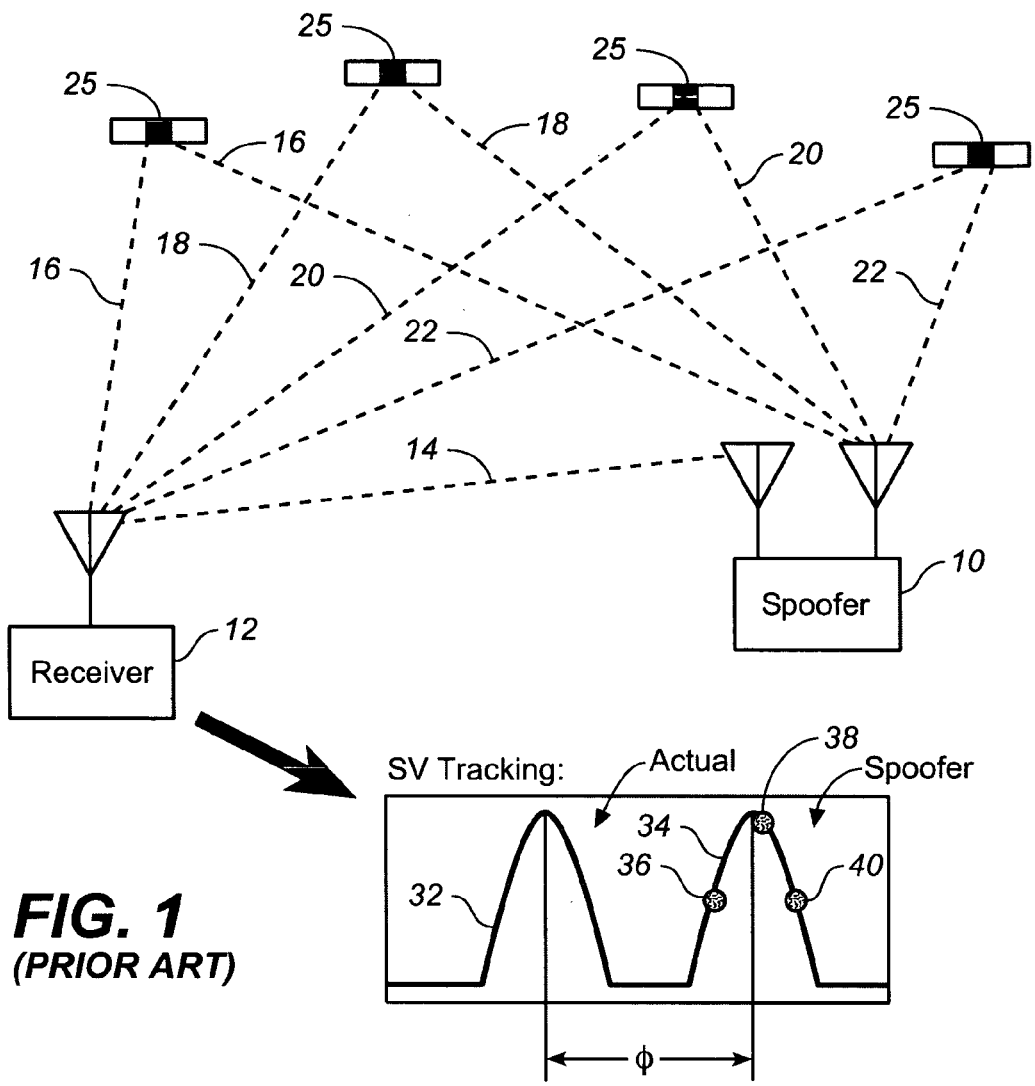
FIG. 1 is a block diagram for a prior art system of tracking a spoofed signal, showing the waveform received by the receiver of such a system.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

The method and apparatus of the present invention may be a hardware circuit, such as a spread-spectrum receiver that is hardwire programmed to perform the signal acquisition and tracking functions outlined herein (e.g., an ASIC), or it may be hardware running firmware, or hardware running software, with the software existing in memory, and with the software written in any computer language (such as C, C++, Perl, Java or the like), and further, and/or in the alternative, the software may be run by a computer system having an operating system. The computer system typically has one or more processors, primary and secondary memory cooperating with the processor(s), which executes instructions stored in the memory, I/O means such as monitor, mouse and keyboard, and any necessary specialized hardware or firmware. Depending on the language used to construct and implement the software, the source code, object code and/or executables of the software may have any number of classes, functions, objects, variables, templates, lines of code, portions of code and constructs (collectively and generally, "a process step", "step", "block", "functional module" or "software module") to carry out the invention in successive stages as described and taught herein, and may be either a standalone software application, or employed inside of or called by another software application, or as firmware. The software process or software module may be constructed so that one portion of code in the application performs a plurality of functions, as for instance in Object Oriented programming (e.g., an overloaded process). The converse is also true, in that a plurality of portions of code could perform a plurality of functions, and still be functionally the same as a single portion of code. At any stage of the process step of the present invention, intermediate values, variables and data may be stored for later use by the program. In addition, the binary executable or source code data comprising the software of the present invention may reside on computer readable storage medium (e.g., a magnetic disk, which may be portable); memory (e.g., flash RAM); DVD or CD-ROM.

Turning attention to FIG. 1, there is shown a block for a prior art system of tracking a spoofed signal. A repeater-based spoofer 10 transmits to a receiver 12 an additional false copy 14 of the actual GPS signals 16, 18, 20, 22 that are broadcast from GPS satellites 25. GPS signals are generally spread-spectrum signals. Thus at least two copies of an original signal are present at the receiver 12. Traditional signal tracking relies on the acquisition process to choose the correct copy of the signal. However, if both the real signal's and the false signal's code phase and Doppler frequencies are similar, the acquisition process will likely have difficulties choosing the correct signal. Under these conditions, it is possible for the receiver to start tracking the wrong copy of the signal. Suppose the true (actual or original) signal is 32, and the false (spoofer) signal to the true signal 32 is spoofer signal 34, which is phase shifted by an amount PHI as shown. The receiver 12 could lock onto and track the spoofed signal 34 rather than the true signal 32. Once traditional tracking begins, only three correlator taps are used (early, prompt, and late) as shown by the solid dots 36, 38, 40, respectively, in FIG. 1. Once an incorrect assumption is made by the receiver 12 that the correct signal is being tracked, the receiver 12 now has no knowledge of the correct signal 32 since it is in fact not tracked, nor of any other signal (including any additional spoofer signals). Further, valuable defensive information is ignored by not tracking the false spoofer signal(s) along with the correct signal.

Figure 2:
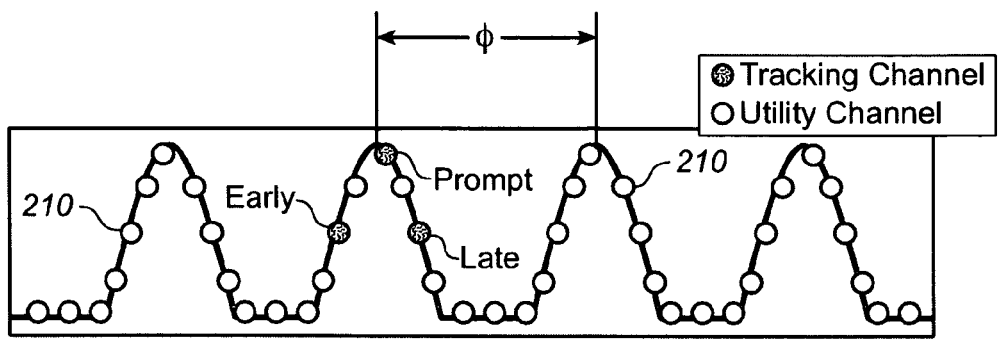
FIG. 2 is a waveform received by the receiver practicing the present invention of tracking a spoofed signal using a primary channel and utility channel.

Turning attention to FIG. 2, there is shown the spoofer tracking methodology of the present invention, which is to efficiently use existing GPS receiver resources, modified by the present invention, to track every copy of the signal received by a receiver, such as a receiver that is part of a GPS satellite system. The receiver, such as receiver 12 (suitably modified by the present invention) now does not have to rely on the acquisition process being infallible. The receiver can now constantly reassess whether it is currently tracking the correct copy of the GPS signal. Different combinations of the signals can be instantaneously compared to verify whether the correct combination of signals is being tracked. Long-term and short-term trends for each signal can now be monitored, which in turn, can be used to help identify the spoofed signals. Lastly, since the spoofed signals are directly tracked, the receiver can provide valuable signal intelligence information such as the spoofer's location.

FIG. 2 shows a signal tracking comparison using the teachings of the present invention of tracking of a true signal along with spoofer signal tracking. In the present invention, spoofer tracking augments traditional signal tracking by the addition of dedicated utility channels that are responsible for searching for and tracking spoofed signals. Thus the same three correlator taps are used, as indicated by the solid dots labeled "Early", "Prompt" and "Late", to track the actual (true) signal, using a tracking channel (primary channel) as described herein, but in addition other taps (represented by the hollow dots, such as dot 210), are used by utility channels to track the spoofer signals, which are generally offset from the actual signal by an amount PHI as shown.

Depending on the number of spare utility channels available and the dynamics of the spoofer signals, a single GPS channel may be used for isolation and geolocation, or many may be used. The receiver may constantly search for extra copies of the GPS signals; therefore, detection is straightforward for all cases, except for when the direct signal (i.e. true signal) is masked. If the utility channels detect additional signals, the receiver automatically knows a spoofer is present. In the case where the direct signal is masked for a particular space vehicle (SV), detection and isolation becomes more complicated since the receiver may only see a single signal, the spoofer. In this case, the advanced algorithms described herein need to be employed. These algorithms are greatly aided by the information gathered through spoofer tracking.

With spoofer tracking, acquisition is no longer the primary defense against spoofers, allowing the receiver to constantly validate the tracking signal. In the prior art, spoofer isolation during acquisition typically uses information relating only to the current space vehicle (SV). This information can be considered micro-information, because it does not necessary capture all of the available information regarding the current threat environment. In contrast, spoofer tracking isolation algorithms in the present invention use macro-information since they have access to information from every spoofed signal. All information available to the receiver over time may be utilized to isolate the desired signal and identify the spoofed signals.

Unlike jammers, spoofers do not try to overwhelm the receiver with relatively strong signals. The spoofer wants its received signal strength to be comparable to the direct GPS signals so that the receiver will attempt to use the deceptive signals. Therefore, spoofers typically transmit with less power when compared to jammers. Classical RF direction finding and time of arrival (TOA) triangulation-based geolocation become difficult for these weak signals. It is reasonable to assume the received spoofer signal levels will be under the background noise floor. Spoofer tracking allows the spoofer's code and carrier phase to be directly measured; and therefore, in many cases the spoofers location can be directly computed (in some cases this requires multiple receive antennas). The spoofer's signal levels are also directly measured by spoofer tracking; therefore, important feedback information can also be provided to adaptive front-end signal processing.

Regarding the present invention capabilities to spoofer tracking principals, spoofer tracking is implemented through the use of additional utility channels, which track the spoofer signals. Each utility channel is assigned a unique pseudo-random number (PRN) code, which is characteristic of GPS signals, and is paired with a primary tracking channel with the same PRN code. The tracking loop for the primary channel remains unmodified and is not required to have any knowledge of the utility channel paired with it. The primary channel attempts to track the signal that it believes is most likely the direct signal. Tracking commands for the primary channel are not only issued to the primary channel hardware, but also to the paired utility channel hardware. Example tracking commands are slew commands that can be used to change the position of the code in the code generator and commands that change the frequencies of the numerically controlled oscillators (NCOs). It is important to note that the utility channel need not provide any feedback to the primary channel's tracking loop. It simply follows the tracking dynamics of the primary channel. If nothing else were done, the utility channel's phase measurements would exactly match the primary channel's phase measurements. Examples of phase measurements include carrier phase measurements and code phase measurements. The correlator is one example of hardware that can be used to measure a signal's phase, and in the case of matching phase measurements, the correlator outputs of the primary channel would match the correlator outputs of the utility channel.

To search for additional copies of the signal, the utility channel is quickly slewed back and forth relative to the primary channel's code center, when the primary channel PRN code is centered. As can be appreciated by one of ordinary skill, when the primary channel PRN code is centered, the local copy of the random numbers that define a GPS signal lines up almost perfectly with the numbers being received from the satellite, and finding the code center means the absolute phase of the incoming signal has been determined. To search relative to the primary channel's code center, is to look for additional copies of the signal that are either latter or earlier in time to the primary channel signal, in relative time. When the utility channel detects a signal after the primary channel PRN code is centered, its timing relative to the direct signal (or what the receiver believes is the direct signal) can be determined. This concept is shown in FIG. 2 as offset phase angle PHI. In FIG. 2, the primary channel, which attempts to track what it believes is the true signal, is tracking what is believed to be the direct signal. The solid dots signify the early, prompt, and late correlator taps of the primary channel, as such correlator taps are used conventionally to track a GPS signal. One or more utility channels are added to the primary channel, and channel information is added, signified by the hollow dots, such as dot 210. Rockwell Collins military GPS receivers typically have six correlator taps per tracking channel; therefore, the utility channel can simultaneously detect signals at six different code offsets (i.e., represented by the hollow dots 210 as shown in FIG. 2). However, in general any number of correlator taps per channel may be used other than six. For example, Rockwell Collins military GPS receivers typically have 256 correlator taps per channel for acquisition channels, which can also be used for spoofer tracking as utility channels.

Once the signal has been measured at a particular phase offset, such as phase offset PHI, the utility channel is slewed to a different phase offset and the process is repeated again to acquire other spoofer signals. By quickly repeating this process the receiver can detect and map multiple copies of the signal, even using a single utility channel; it is not required that a single utility channel be dedicated to a single spoofer signal.

For illustrative purposes, the utility channel slewing process can be compared to a classical mechanically steered radar. The radar antenna can only receive returns from a single direction; therefore, it is swept back and forth to search for returns from different directions. Just as with the mechanical steered radar, the utility channel's sweep speed dictates its ability to track dynamic signals. However, the utility channel only has to track the relative dynamics between the real and false signals. The primary channel's tracking loop is following common dynamics such as vehicle dynamics and dynamics due to satellite motion. It is possible for the spoofed signals to have radically different dynamic qualities. However, it is likely advantageous to the spoofer to keep the false signal's dynamics similar to the real signal's dynamics to in turn make it more difficult for the receiver to differentiate between the direct and the spoofed signals.

Spoofer tracking loops do not have to remain locked onto the signal; however, enough continuity is needed so that the signal can be followed from one scan to the next. Since the primary channel tracking removes common dynamics, spoofer tracking normally only requires low bandwidth tracking loops. To some degree, tracking becomes easier with quicker, more frequent scans. There is an important design tradeoff between dwell time and slew rate. As can be appreciated by one of ordinary skill in the art, the slew rate is equivalent to saying how quickly the signal search window is moved to the next location. Dwell time is how long one stays at any one search location. Slew rate and dwell time are inverse concepts.

Typical receivers can only issue slew commands to the hardware at fixed discrete time intervals (e.g., 50 Hz). However, slew rate commands can be used to make the hardware slew continuously for a given period. This rate is limited by the amount of correlator integration needed to bring the signal out from the background noise. If required, the receiver can employ variable-rate slewing. Quick slews with little integration will likely be sufficient for signal detected. Then when the receiver is slewing through a region where it is tracking a signal, the slew rate can be decreased (effectively increasing dwell and therefore integration time).

In most cases, a single utility channel will likely be sufficient to detect the presence of a spoofer. A single channel can be used to detect and track multiple copies of the signal. When in detection mode, the different PRN codes can be sequentially rotated through the utility channel to allow the receiver to detect spoofed copies of the signals from any satellite—since every satellite has its own PRN code, therefore each satellite must transmit an unique signal so that the receiver can distinguish the signals from each satellite, as every GPS satellite transmits on the same frequency and at the same time. The assignee of the present invention, Rockwell Collins, currently produces 24 channel receivers that support simultaneous L1 and L2 tracking on up to twelve satellites. Such a receiver could be designed to substitute one of its dual frequency channels for a spoofer detection channel, thus allowing the present invention to readily use and be backwardly compatible with existing GPS hardware. Once a spoofer is detected, the receiver can switch modes and use additional utility channels to isolate and geolocate (i.e., find the position of) the spoofer.

Turning attention now to counter-spoofing measures, it should be noted that several different techniques can be used to create spoofers. The spoofers can be categorized into three main categories: repeaters, advanced repeaters, and security-compromised spoofers.

The most basic, and therefore the easiest to build spoofer, is a simple bent-pipe repeater. A bent-pipe repeater receives signals from the GPS satellites and simply re-broadcasts the signal, possibly with an added delay. Assuming the repeater is not located directly along the line-of-sight to the satellite, the extra path length to the repeater will always cause the repeated signal to arrive later than the direct signal. Assuming the direct signal is not masked, bent-pipe repeater signals can be isolated by making sure the receiver is tracking the first copy of the signal. If spoofer tracking determines that the direct channel is tracking a repeated signal, a slew command can be instantaneously issued to the direct channel to cause it to snap to the direct signal without re-acquiring. This is possible because spoofer tracking directly measures the phase difference between the signals. In the case where the direct signal is masked, the more advanced algorithms described herein need to be employed.

Figure 3:
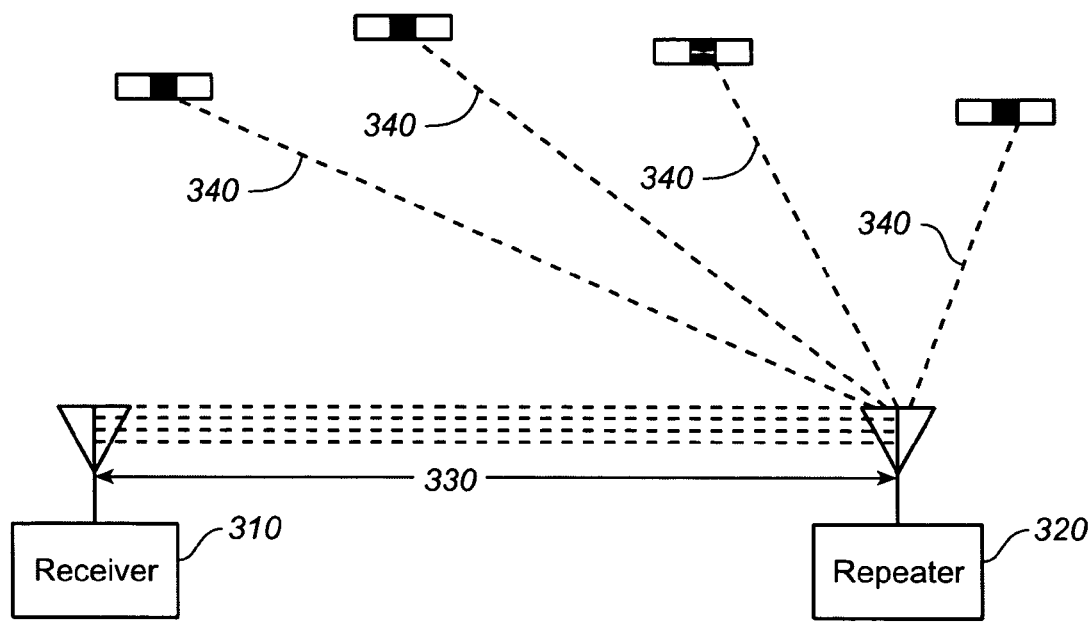
FIG. 3 is a schematic showing repeater geolocation using a method of the present invention.

FIG. 3 shows how a receiver can geolocate a single repeater in this simple bent-pipe repeater case, which can be termed the bent-pipe/added delay routine. If the receiver 310 was co-located with the repeater 320 (sharing the repeater's receiver antenna), the receiver could solve for the position of the repeater. By separating the repeater and the receiver by a distance 330, equal path delay is added to each satellite's signal 340 (similar to running a cable from the receiver to the repeater's antenna). When solving for position, this common delay will be captured by the clock-bias term and will have no impact on geolocating the repeater's receive antenna. The receiver can use, in its memory storing the method as taught herein, the first copy of the signals (i.e., the direct signal, which by definition in an environment consisting of only bent-pipe repeater spoofers is the first copy of the signals received by the receiver) to compute its position and the second copy of the signal(s) (spoofed signals) to solve for the spoofer(s) position. This simple added delay or bent-pipe geolocation technique is only possible when the spoofer signals are being tracked, instead of being ignored, as most anti-jam (NJ) system would tend to do. By integrating the spoofer signal, spoofer tracking can geolocate spoofers whose signal powers are well below the background thermal noise.

Simple repeaters as outlined in FIG. 3 may therefore try to conceal their location by modifying their transmitted signals. However, since they do not have access to GPS key codes, they cannot generate their own codes and are limited in what they can do. A repeater could add noise to the signal to make tracking more difficult. However, a spoofer wants the receiver to track its signals, and therefore, this is not likely since it compromises the performance of the spoofer. A repeater could add fixed or variable delays to the transmitted signal. Again, common delays are captured by the clock-bias term and do not hamper mitigation or geolocation. At most, variable delays may require spoofer tracking loops to have increased bandwidth. An advanced repeater could use a beamforming antenna to place separate beams on each SV (space vehicle) and then add different delays to each SV before transmitting. The direct signal will still always arrive first; therefore, this has no impact on spoofer detection and isolation. However, geolocation now requires advanced isolation and geolocation algorithms (described infra). And lastly, a simple way to complicate repeater geolocation is to simply transmit multiple copies of the signals, possibly from separate antennas. This has no impact on detection and isolation; however, advanced isolation and geolocation algorithms are now needed.

The present invention discloses three complementary solutions for identifying and geolocating advanced repeaters and security-compromised spoofers, comprising the following routines (which can be software routines residing in memory): (1) the consistency method; (2) the nuller/beamformer method; and (3) the multiple antennas method. These methods can be applied independently or together to form the basis for a robust spoofer mitigation and geolocation system. Each method is designed to utilize the specialized information created by spoofer tracking, and resides in suitable memory when employed as a software routine in a receiver employing the present invention.

Regarding the consistency method for identifying and tracking advanced repeaters and security-compromised spoofers, the spoofer tracking of the present invention attempts to track every GPS signal, both the direct signals and the spoofed GPS signals. However, for each SV (space vehicle), the receiver must determine which signal is the direct signal. Moreover, there exists some combination of signals that can be used to compute the receiver's current GPS position (since a goal of GPS is to determine the position of a device that is listening to the GPS signals, the receiver, as well as for the receiver to ascertain that it is listening to the correct GPS signals). To find this combination of signals, the receiver may have to sort through many different signal combinations. With the advent of modern high-speed processors, this is possible; however, the search space can be greatly reduced by throwing out unlikely combinations. For example, one can disregard signals with large discrepancies in time and frequency. One can also mathematically compute confidence levels for each combination of signals to determine which set is statistically most likely to be the direct signals. The sum-squared error of the solution residuals (similar to the parity magnitude computation used in flight critical avionics GPS receivers) can be used to identify which combinations are consistent and are the most likely to be the direct signals. If at this point, there is still no unique solution, consistency between L1 and L2 can be checked. Next, approximate knowledge of either motion or location can be used to compute a measure of the statistical confidence in the consistency of each set of measurements. This information can be provided from several sources: last known good GPS position, basic knowledge of the vehicle dynamic capabilities, a priori knowledge of the vehicle's flight profile, a simple speed sensor, an inertial sensor, and the like. Consistency checks begin at the signal processing level (power levels, Doppler frequency, etc), continue at the navigation processing level (e.g., cross-measurement consistency), and even extend to consistency checks across multiple sensors (both similar and dissimilar). To aid multiple spoofer geolocation, consistency checks can be extended from the true signals and applied to the spoofed signals. Also, an approximate solution from a backup system, such as Loran, can prove to be an extremely valuable asset when trying to choose the correct signal.

Generally, the consistency method outlined above (method one) is used mainly for identification of spoofer signals only. Method one can be used for geolocation only if one assumes the threat is repeating the GPS signals exactly as it receives them. The relative signal phases (i.e. the satellites 340 in FIG. 3) will uniquely describe the position of the repeater 320. Once the receiver 310 has correctly identified the repeater's signals, the relative phases can be measured, and the location of the repeaters can be solved. Only one receiver and one receive antenna is needed, but the threat must be a single, simple repeater for this method to work for geolocation. Consequently, method one is used mainly for identification rather than geolocation of the spoofer.

The second method disclosed by the present invention for identifying and geolocating spoofer signals from advanced repeaters and security-compromised spoofers is the nuller/beamformer method. This method relies on the fact that an anti-jam (NJ) front-end will still likely be needed to defend against jammers. Simply placing a beam on the SV is not enough to defend against spoofers. Since spoofed signals are generally received with more power than signals from GPS satellites, enough signal can leak through the sides of the antenna pattern (side lobes) to confuse a standard GPS receiver. However, when combined with spoofer tracking, robust mitigation and geolocation can be achieved.

Figure 4:
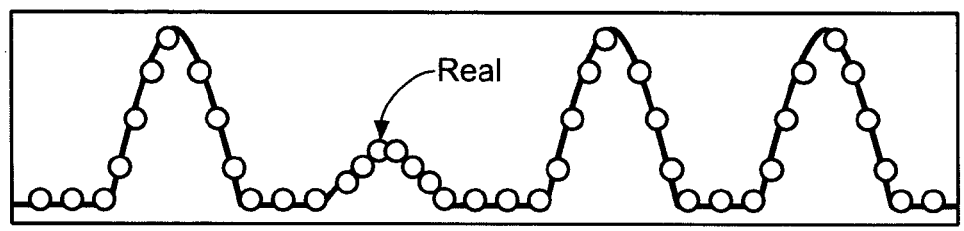
FIG. 4 is a schematic showing the waveform received by a receiver of the present invention when using the nuller/beamforming method for counteracting advanced security-compromised repeaters.

A beamformer is an electronically steerable antenna. Its gain (and conversely, the lack of gain) can be electronically controlled. Antenna gain can be applied in the direction of the GPS satellite. Since the satellite's position is known, the area of the sky where the signal should come from can be predicted. The antenna gain in the direction of the actual GPS satellite can be switched on and off and by doing so, the signal strength of the real GPS signal should also increase and decrease. By switching the beam to the SV (space vehicle) on, and then off, the direct (i.e. true or real) signal can be identified, since its signal should increase by the most when the beam of the beamformer is switched on the transmitter or repeater in question. Conversely, a null (an antenna location with very little gain) can be placed in the direction of the GPS satellite. The direct signal will decrease the most after placement of an antenna null on a transmitter of the direct signal, compared to signals received by the receiver from spoofers, and will show a relative minimum compared to other peaks. By contrast, there will be less of a decrease from the transmitters and repeaters that transmit spoofer signals when a null signal is received. Thus the true signal can be determined; this is illustrated graphically in FIG. 4, which shows a relative minimum for the real signal received when compared to the spoofer signals, when a null is placed by a beamformer on the transmitter/repeater, of the GPS signal.

The nuller approach is attractive since generally it is easier to create a single, sharp, deep null than it is to create a narrow beam with no gain on the pattern sides. Thus the nuller/beamformer method contemplates either switching a direct beam on/off or creating a single, sharp, deep null; the latter is preferred. The nuller only has to be turned on for a relatively short time (1-20 ms); therefore, disruption to the tracking-loops is minimized. Once the real signal has been identified, the direct channel is issued an instantaneous slew command to capture the direct signal. Once the real signal has been identified, the nuller (or beamformer) is no longer needed, unlike when dealing with jammers. Therefore, only a simple single-null system may be used to mitigate multiple spoofer threats. One can sequentially cycle through each PRN to identify each satellite's direct signal one at a time. Likewise, the receiver only needs a single beam input.

Next, the bearings to each spoofer can be determined, again with the aid of a nuller. Bearings from multiple friendly locations can be used to geolocate the enemy spoofer, with the friendly locations separated by a known distance from one another. In addition, a null can sweep along the horizon (or above the horizon when looking for airborne spoofers). By monitoring the spoofer's signal power, the receiver can determine when the null is placed on the spoofer. Since this approach directly measures the relative power of the spoofed signals, it can provide valuable feedback information to the nuller.

Figure 5:
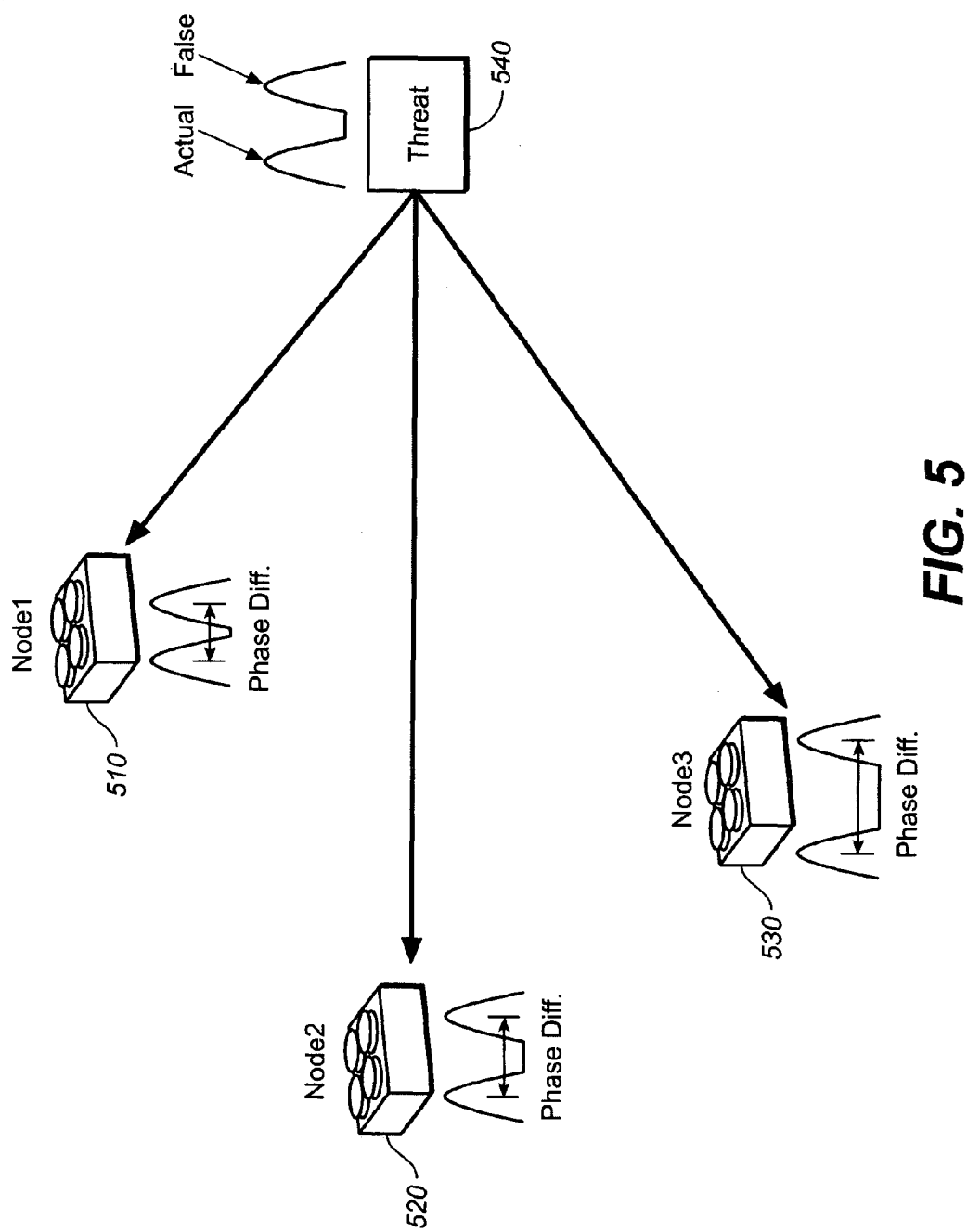
FIG. 5 is a method of geolocating for the present invention involving multiple antennas.

The third method disclosed by the present invention for dealing with advanced repeaters and security-compromised spoofers comprises the multiple antennas method, shown in FIG. 5. Multiple antennas with non-trivial baselines, such as friendly nodes 510, 520, 530, separated by known distances (baselines), are combined with spoofer tracking to geolocate the enemy spoofer, threat 540. Time of arrival (TOA) measurements are formed at each antenna by computing the code and phase offsets between each spoofer signal and the direct signal for each PRN code received by the nodes, as shown graphically with different phase differences at nodes 510, 520, 530 in FIG. 5. Time difference of arrival (TDOA) measurements are computed by differencing the TOA measurements between the antennas. The spoofers location can solved for based on these TDOA measurements. Geolocation is complicated by the presence of multiple spoofers; however, a robust system can be created, when combined with methods (1) and (2) above, the consistency method and the nuller method. The receiver and antenna pairs do not even have to be co-located. Geolocation accuracy is greatly improved by lengthening the baseline between the antennas and/or adding more antennas.

If digital communication radios are available, the multiple antennas method lends itself to a distributed, networked-node arrangement, since relatively small amounts of data has to be shared. This is typically not the case for classical signal intelligence receivers where massive amounts of data has to be shipped around so signals from one antenna can be correlated with signals from other antennas. Here, the spoofed signals are integrated and tracked by the GPS receiver, so only the relative code and carrier phase has to be shared among nodes. This information can typically be represented with a few numbers, as opposed to having to send gigabytes of wide-dynamic range A-to-D converter values.

Lastly, in the case which the independent receivers cannot determine which received signal is the direct signal, coordinated isolation is needed. Time transfer between nodes (e.g. via RF link) can be used together with the TOA measurements to identify and geolocate the spoofer. The need for relative time transfer between nodes mostly has implications and is used for networked-nodes, since time-transfer is less of an issue for co-located receivers.

Figure 6:
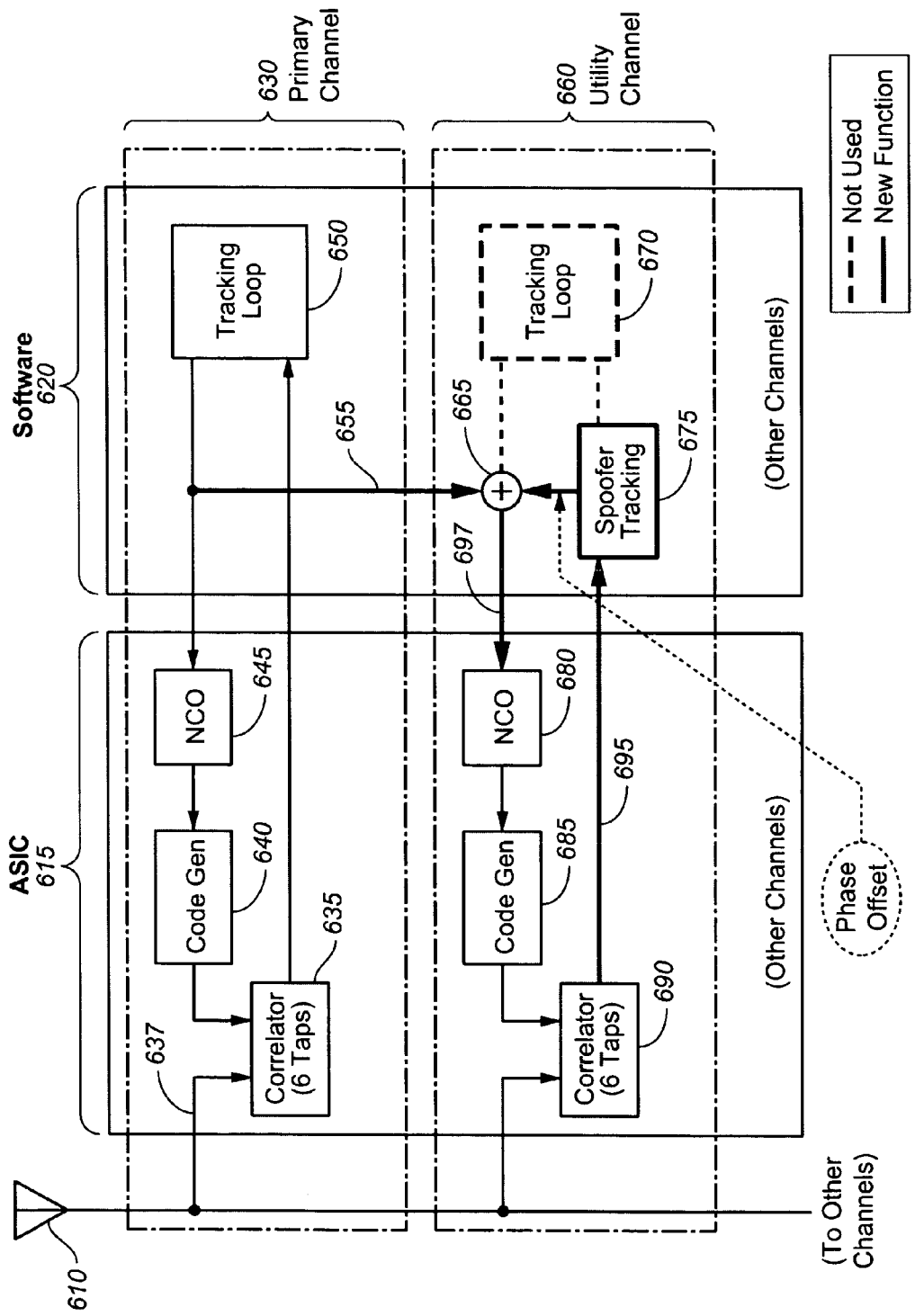
FIG. 6 is a hardware and software instantiation of a spoofer tracking signal processing system for a receiver of the present invention.

Turning attention now to FIG. 6, there is shown one hardware instantiation of a spoofer tracking signal processing system of the present invention for implementing the present invention. A signal comprising a GPS signal is received in antenna 610 of a tracking and acquiring ASIC signal processing system, which can be termed the tracking means, shown as a hardware portion 615 and a software portion 620, but in general the tracking means may be all hardware or all software. In addition, the present invention is designed to be backwardly compatible with existing GPS signal tracking and acquiring hardware. Thus only portions of existing software (or hardware, as the case may be) need be redesigned for new functionality, as indicated in FIG. 6 with the software outlined by heavy lines labeled "New Function". As further shown in FIG. 6, a primary channel 630 is responsible for tracking the direct signal (the original, true, real or unspoofed signal(s)), using the ASIC portion 615, typically mask programmable, and the software portion 620 that may be readily programmed.

In FIG. 6 correlators 635 and 690 are shown receiving signals from antenna 610. As is known per se in the art, a correlator measures how well the local copy of the signal from the code generator 640 or 685 matches the signal from the antenna 610, and it does this for N copies of the local signal. Each copy will have a slightly different code phase. Correlator blocks 635 and 690 are shown in FIG. 6 as six taps, but in general are N-tap correlators. For Rockwell Collins receivers, the assignee of the present invention, N usually equals 6, but in general can be any number tap. The 6 tap correlator 635 demodulates the received signal 637 input from antenna 610, with input from the output of a code generator, Code Gen 640, which has the GPS keys used to demodulate the GPS signal, a spread-spectrum signal. If the receiver is tracking civilian versions of the GPS signal, GPS keys are not employed. The code generator block Code Gen 640 receives as input the output of NCO block 645. NCO stands for numerically controlled oscillator; the NCO block tells the Code Gen block what the current signal phase should be. NCO block 645 input in turn is connected to the output of Tracking Loop 650. The tracking loop determines the best estimate of the incoming signal's phase based on the correlators' outputs. The Tracking Loop 650 connects to the correlator 635 as shown and receives the correlator output. Part of the output of the Tracking Loop 650 is fed to the utility channel 660, which tracks one or more spoofer signals.

Spoofer tracking is implemented through the use of additional utility channels, such as utility channel 660. Utility channel 660 is assigned a unique PRN code and is paired with a primary tracking channel with the same PRN code, as provided through a feedback shunting signal path 655, which feeds the output from tracking loop 650 in the primary channel 630 to the utility channel 660, and is received at summer 665. While in FIG. 6 the utility channel 660 has a tracking loop 670, it is unused, and the same kind of tracking commands for the primary channel 630 are not only issued to the primary channel hardware, but also to the paired utility channel hardware, at Spoofer Tracking block 675. Examples of tracking commands are slew commands that can be used to change the position of the code in the code generator and commands that change the frequencies of the numerically controlled oscillators (NCOs). The spoofer tracking block is where the tracking commands are input for the utility channel, such as shown with the command that changes the phase offset, shown in dashed lines as "Phase Offset" in FIG. 6. The utility channel does not provide any feedback to the primary channel's tracking loop; it simply follows the tracking dynamics of the primary channel.

The utility channel 660 is quickly slewed back and forth by changing the phase, shown in dotted lines in FIG. 6 as "Phase Offset", with a phase offset, relative to the primary channel's code, at the output of the Spoofer Tracking block 675, in order to search for additional copies of the received signal, that is, in order to search for spoofer signals. As with the primary channel 630, and with similar functionality, each utility channel has a NCO block 680, a Code Generator block 685 and a correlator 690, which is a 6 tap correlator, but in general can be any number tap correlator, to acquire the spoofed signal from the antenna 610. Code Generator block 685 shares the same keys as the primary channel code generator block 640, but only if encrypted military GPS signals are being tracked. When the utility channel detects a signal, its timing relative to the direct signal (or what the receiver believes is the direct signal) can be determined. Once the signal has been measured at a particular phase offset, the utility channel is slewed to a different phase offset and the process is repeated again. By quickly repeating this process the receiver can detect and map multiple copies of the signal, as shown in FIG. 2.

The spoofer tracking signal processing system of FIG. 6 is adapted to be easily retrofitted to an existing GPS receiver to upgrade the receiver. For example, in FIG. 6 the only new functions or elements are output line 655, Spoofer Tracking block 675 (which can be implemented in software), output 695 from utility channel correlator 690, and output 697 from the summer 665, which are indicated in FIG. 6 by the heavier lines labeled "New Function", and some or all of which can be implemented in software. Further, the utility channel 660 may be built substantially similar for manufacturing purposes as the primary channel, as shown in FIG. 6, but hardware or software features not used in the utility channel, such as the tracking loop 670, may be disabled.

Further, the hardware and software instantiation of a spoofer tracking signal processing system for a receiver of the present invention has suitable memory to store the data, instructions, algorithms and methods of acquiring and tracking spoofer signals, geolocating spoofers, and counteracting advanced and security-compromised spoofers. Suitable additions can be made by one of ordinary skill in the art to the present invention from the teachings herein. For example, it should be understood that while as taught herein the primary channel is designed for tracking the real signal and the utility channel for tracking spoofer signals, at any time the primary channel may for a time erroneously track the spoofer signal, and likewise the utility channel(s) may erroneously track the real signal, until such time that the mistake is recognized. However, this in no way negates the claimed invention or the teachings herein. Further, while GPS is disclosed in the present invention, the architecture and methodology of the present invention can be applied to any navigation system in general, where GPS is but one example. Other examples include GLONASS (Russia) and GALILEO (EU).

Although the present invention has been described in terms of the preferred embodiments above, numerous modifications and/or additions to the above-described preferred embodiments would be readily apparent to one skilled in the art.

It is intended that the scope of the present invention extends to all such modifications and/or additions and that the scope of the present invention is limited solely by the claims set forth below.

I claim:

1. A spoofer tracking system for a receiver comprising:
a primary channel in a receiver comprising means for tracking an original signal;
a utility channel in the receiver comprising means for tracking a spoofer signal, said utility channel coupled to the primary channel;
wherein the spoofer tracking system tracks both the original signal and the spoofer signal,
said primary channel tracking means comprises a primary channel correlator receiving said original signal; a primary channel tracking loop receiving output from said correlator for tracking said original signal, said tracking loop responding to tracking commands, said correlator operatively connected to receive signals from said primary channel tracking loop; and,
said utility channel tracking means comprises a spoofer tracking block for tracking said spoofer signal, said utility channel receiving output from said primary channel tracking loop, and said spoofer tracking block responding to the same said tracking commands as said primary channel tracking loop; and a utility channel correlator receiving said spoofer signal;
wherein said original and spoofer signals are navigation signals.

2. The invention according to claim 1, further comprising:
a plurality of receivers, each having a said primary channel and at least one said utility channel;
said plurality of receivers separated by a predetermined distance from one another;
said original signal and said spoofer signal are navigation signals;
said means for tracking in said utility channel to track and measure the spoofer signal code and carrier phase; and,
means for sharing said code and carrier phase measurements of spoofer navigation signals tracked between said plurality of receivers.

3. The invention according to claim 1, wherein:
said primary channel tracking means comprises a numerically controlled oscillator (NCO), said primary channel NCO receiving input from said primary channel tracking loop and outputting a signal for said primary channel correlator;
said utility channel tracking means comprises a NCO, said utility channel NCO receiving input from said utility channel spoofer tracking block and outputting a signal for said utility channel correlator; and,
a primary channel code generator for said primary channel tracking means and utility channel code generator for said utility channel tracking means, said primary and utility channel code generators having pseudo-random number (PRN) codes to provide to said primary and utility channel correlators to demodulate said navigation signals.

4. The invention according to claim 3, wherein:
said tracking commands comprise slew commands, said utility channel tracking means spoofer tracking block searching for spoofer signals by slewing back and forth relative to the phase of the original signal.

5. The invention according to claim 1, further comprising:
said channel tracking means is assigned a pseudo-random number (PRN) code and said utility channel tracking means is assigned the same PRN code as said primary channel; and,
wherein said original signal is a military encrypted navigation signal;
a plurality of original navigation signals transmitted from a plurality of navigation satellites;
a plurality of PRN codes, each PRN code uniquely corresponding to one of said plurality of navigation satellites;
said channel tracking means tracking said plurality of original navigation signals and employing said plurality of PRN codes; and,
said utility channel tracking means tracking a plurality of spoofer signals corresponding to said plurality of original navigation signals.

6. The invention according to claim 1, further comprising:
means for geolocating a spoofer transmitting said spoofer signal; said geolocating means comprising routines for locating said spoofer selected from the group consisting of: the bent-pipe/added delay routine; the consistency routine; the nuller/beamformer routine; or the multiple antennas routine;
wherein said spoofer tracking system geolocates the spoofer transmitting said spoofer signal.

7. The invention according to claim 1, further comprising:
means for identifying the spoofer signals from a spoofer, said identifying means comprising routines for identifying spoofer signals selected from the group consisting of: the consistency routine; the nuller/beamformer routine; or the multiple antennas routine;
said utility channel tracking means receiving a signal from said primary channel and is coupled in parallel to said primary channel;
wherein said spoofer tracking system identifies said spoofer signals and tracks said spoofer signals in said utility channel simultaneously with the identification and tracking of said original signal in said primary channel.

8. A spoofer tracking system for a receiver comprising:
a primary channel in a receiver comprising means for tracking an original signal;
a utility channel in the receiver comprising means for tracking at least one spoofer signal, said utility channel coupled to the primary channel;
wherein the spoofer tracking system tracks both the original signal and the spoofer signal,
said primary channel tracking means comprises a N-tap correlator receiving said original signal as input and outputting a signal to a tracking loop, said primary channel tracking loop estimating the phase of said incoming original signal;
said utility channel tracking means comprises a N-tap correlator receiving said spoofer signal as input and outputting a signal to a spoofer tracking block, said spoofer tracking loop tracking said spoofer signal and the utility channel tracking means operatively connected to the output of said primary channel tracking loop;
said primary channel tracking means comprises a numerically controlled oscillator (NCO), said primary channel NCO receiving input from said primary channel tracking loop and outputting a signal for said primary channel correlator;
said utility channel tracking means comprises a NCO, said utility channel NCO receiving input from said utility channel spoofer tracking block and outputting a signal for said utility channel correlator;
said primary channel tracking means receives a PRN code and said utility channel tracking means is assigned the same PRN code as said primary channel;
said tracking commands comprise slew commands, said utility channel tracking means spoofer tracking block searching for spoofer signals by slewing back and forth relative to the phase of the original signal.

9. A method of spoofer tracking of a spread-spectrum signal in a receiver, comprising the steps of:
receiving transmitted spread-spectrum signals with a receiver, the spread spectrum signals comprising an original signal and a spoofer signal;
tracking the original signal in a primary channel of the receiver;
tracking the spoofer signal in a utility channel of the receiver, with the said utility channel coupled to the primary channel and receiving signals from the primary channel;
tracking both the original signal and the spoofer signal simultaneously in parallel channels after acquiring both the original and spoofer signals;
demodulating the received spread-spectrum original signal with a primary correlator;
tracking said original signal with a primary channel tracking loop;
responding to tracking commands, said primary channel tracking loop;
receiving output from said primary channel correlator;
operatively connecting the output of said primary channel tracking loop to said primary channel correlator;
tracking said spoofer signal with a spoofer tracking block in said utility channel, said utility channel spoofer tracking block responding to the same tracking commands as said primary channel tracking loop; and
providing a signal output from said primary channel tracking loop to said utility channel.

10. The method according to claim 9, further comprising the steps of:
generating pseudo-random number (PRN) codes with a primary channel code generator for demodulating said original signal;
providing said PRN codes to the primary channel correlator for demodulating said original signal; said original signal a navigation signal;
demodulating the received spread-spectrum spoofer signal with a utility channel correlator;
generating pseudo-random number (PRN) codes with a utility channel code generator for demodulating said spoofer signal;
providing said utility channel PRN codes to the utility channel correlator for demodulating said original signal; said spoofer signal a navigation signal; and
assigning said primary channel with a PRN code and assigning said utility channel the same PRN code as said primary channel.

11. The method according to claim 10, further comprising the steps of:
providing a plurality of PRN codes for said primary code generator and said utility channel code generator, for a plurality of navigation signals from a plurality of navigation satellites, each of said PRN codes corresponding uniquely to one of said plurality of navigation satellites.

12. The method according to claim 11, further comprising the steps of:
employing a plurality of utility channels, each of said utility channels having a least one of said plurality of PRN codes;
employing a plurality of receivers, each of said receivers having a primary channel and at least one said utility channel;
geolocating a spoofer emitting a spoofer signal by employing a method selected from the group of routines consisting of: the consistency routine; the nuller/beamformer routine; or the multiple antennas routine; and,
detecting a spoofer signal by employing a method selected from the group of routines consisting of: the bent-pipe/added delay routine; the consistency routine; the nuller/beamformer routine; or the multiple antennas routine.

13. The method according to claim 9, further comprising the steps of:
said tracking commands comprise changing the slew rate, and changing the phase offset in said spoofer tracking block;
searching for spoofer signals with said utility channel by slewed back and forth relative to the primary channel's PRN code.

14. The method according to claim 9, further comprising the steps of:
geolocating the spoofer transmitting said spoofer signal; said method of geolocating comprising routines for locating said spoofer selected from the group consisting of: the bent-pipe/added delay routine; the consistency routine; the nuller routine; or the multiple antennas routine;
wherein said spoofer identification and tracking method geolocates the spoofer transmitting said spoofer signal, and,
identifying the spoofer signal; said method of identifying the spoofer signal comprising routines selected from the group consisting of: the consistency routine; the nuller routine; or the multiple antennas routine;
wherein said spoofer tracking method identifies spoofer signals by employing one of said routines.

15. A method of spoofer tracking of a spread-spectrum signal in a receiver, comprising the steps of:
receiving transmitted spread-spectrum signals with a receiver, the spread spectrum signals comprising an original signal and a spoofer signal;
tracking the original signal in a primary channel of the receiver;
tracking the spoofer signal in a utility channel of the receiver, with the said utility channel coupled to the primary channel and receiving signals from the primary channel;
tracking both the original signal and the spoofer signal simultaneously in parallel channels after acquiring both the original and spoofer signals;
retrofitting an existing navigation receiver for spoofer tracking, the retrofitting comprising the steps of:
in a existing navigation receiver having a first, primary channel for tracking an original navigation spread-spectrum signal, comprising a primary channel correlator for receiving the original signal, the correlator outputting a signal to a primary channel tracking loop for tracking the original signal, the tracking loop obeying tracking commands, the tracking loop outputting a signal to a primary channel numerically controlled oscillator (NCO), the NCO outputting a signal to a primary channel Code Generator, the Code Generator output operatively connected to an input of the correlator;
the existing navigation receiver having a second, utility channel, substantially similar to the primary channel, for tracking a spoofer signal to the original signal, comprising a utility channel correlator for receiving the spoofer signal, the utility correlator outputting a signal to a spoofer tracking block for tracking the spoofer signal, the utility channel receiving a signal from the output of the primary channel tracking loop, and obeying the same tracking commands as the primary channel tracking loop, the spoofer tracking block outputting a signal to a utility channel numerically controlled oscillator (NCO), the NCO outputting a signal to a utility channel Code Generator, the Code Generator output operatively connected to an input of the utility channel correlator, and a second utility channel tracking loop that is not used;

wherein, the existing navigation receiver is retrofitted by the steps of:

connecting the spoofer utility channel to receive a signal from the output of the primary channel tracking loop;

summing the output of the signal from the output of the primary channel tracking loop and the output of the spoofer tracking block, with the summer output going to the utility channel NCO;

connecting the output of the utility channel correlator to the input of the spoofer tracking block; and, disabling the utility channel tracking loop.

16. The method according to claim 9, further comprising the steps of:

geolocating the spoofer emitting the spoofer signal by employing a method selected from the group of routines consisting of: the consistency routine; the nuller/beamformer routine; or the multiple antennas routine; and, detecting the spoofer signal by employing a method selected from the group of routines consisting of: the bent-pipe/added delay routine; the consistency routine; the nuller/beamformer routine; or the multiple antennas routine; and further comprising the steps of:

simultaneously tracking several spoofer signals in the utility channel, in parallel with said primary channel tracking of the original signal.

17. A spoofer tracking architecture to retrofit a navigation receiver for spoofer tracking comprising:

a first channel, a primary channel for tracking an original navigation spread-spectrum signal, comprising a primary channel correlator for receiving the original signal, the correlator outputting a signal to a tracking loop for tracking the original signal, the tracking loop obeying tracking commands, the tracking loop outputting a signal to a primary channel numerically controlled oscillator (NCO), the NCO outputting a signal to a primary channel Code Generator, the Code Generator output operatively connected to an input of the correlator;

a second channel, a utility channel, for tracking a spoofer signal to the original signal, comprising a utility channel correlator for receiving the spoofer signal, the utility correlator outputting a signal to a spoofer tracking block for tracking the spoofer signal, and obeying the same tracking commands as the primary channel tracking loop, the utility channel receiving a shunting signal from the output of the primary channel tracking loop, the shunting signal input into a summer which receives the output of the spoofer tracking block, the summer outputting a signal to a utility channel numerically controlled oscillator (NCO), the NCO outputting a signal to a utility channel Code Generator, the Code Generator output operatively connected to an input of the utility channel correlator; and, wherein the utility channel is substantially similar in layout to the primary channel, the utility channel having a tracking loop that is disabled.

* * * * *